April 3, 1934.　　　　F. S. KINGSTON　　　　1,953,179
CLUTCH
Original Filed July 25, 1929

INVENTOR
Frederick S. Kingston
BY
Evans + McCoy
HIS ATTORNEYS

Patented Apr. 3, 1934

UNITED STATES PATENT OFFICE 1,953,179

CLUTCH

Frederick S. Kingston, Warren, Ohio, assignor, by mesne assignments, to Sunlight Electrical Company, Warren, Ohio, a corporation of Ohio Original application July 25, 1929, Serial No. 380,873. Divided and this application April 7, 1932, Serial No. 603,808

9 Claims. (Cl. 192—90)

This invention relates to dynamo electric machines and particularly to a clutch mechanism that is particularly suitable for use in connection with fractional horse power motors, and is a division of my copending application Serial No. 380,873 filed July 25, 1929 and abandoned after the filing of this application.

The adaptation of the present invention shown in the accompanying drawing is for a fractional horse power motor in which certain clutch elements for connecting the rotor thereof to the load are held in driving relation by spring means and are disengaged by means of a suitable electromagnet to relieve the rotor of the load.

In motors of this general class the winding for disengaging the clutch elements is generally energized from the motor load current during the starting period, so that this clutch winding may be short-circuited after a predetermined speed is reached to permit the engagement of the clutch elements and thereby connect the rotor to the load.

In single phase induction motor applications of this character it is found that the load current drops off materially and therefore the power of the clutch disengaging winding to hold the clutch out of engagement until the motor is up to a proper speed for taking over the load likewise drops off appreciably. As a result of this drop in power of the clutch disengaging winding, the load is frequently prematurely applied to the motor before the motor is up to the proper speed for taking over the load.

It is therefore one of the objects of the present invention to provide a clutch disengaging device of the character referred to with simple mechanical means for holding the clutch elements out of engagement until such time as the motor is up to the proper speed for taking over its load.

Another object is to provide efficient latching means that assists the electromagnet in holding the clutch elements disengaged until the electromagnet is substantially de-energized, thereby preventing the engagement of the clutch elements for assuming the load prior to the time that the clutch winding is de-energized.

With the above and other objects in view which will be clearly apparent from the following detailed description, the present invention consists in certain features of construction and combinations of parts which will be readily understood by those skilled in the art to which the invention appertains.

In the drawing which illustrates a suitable adaptation of the present invention, Figure 1 is a side elevation of a fractional horse-power motor, a portion of the same being broken away and shown in section to show the clutch elements and associated actuating mechanism;

Figures 1, 2, 3, 4:
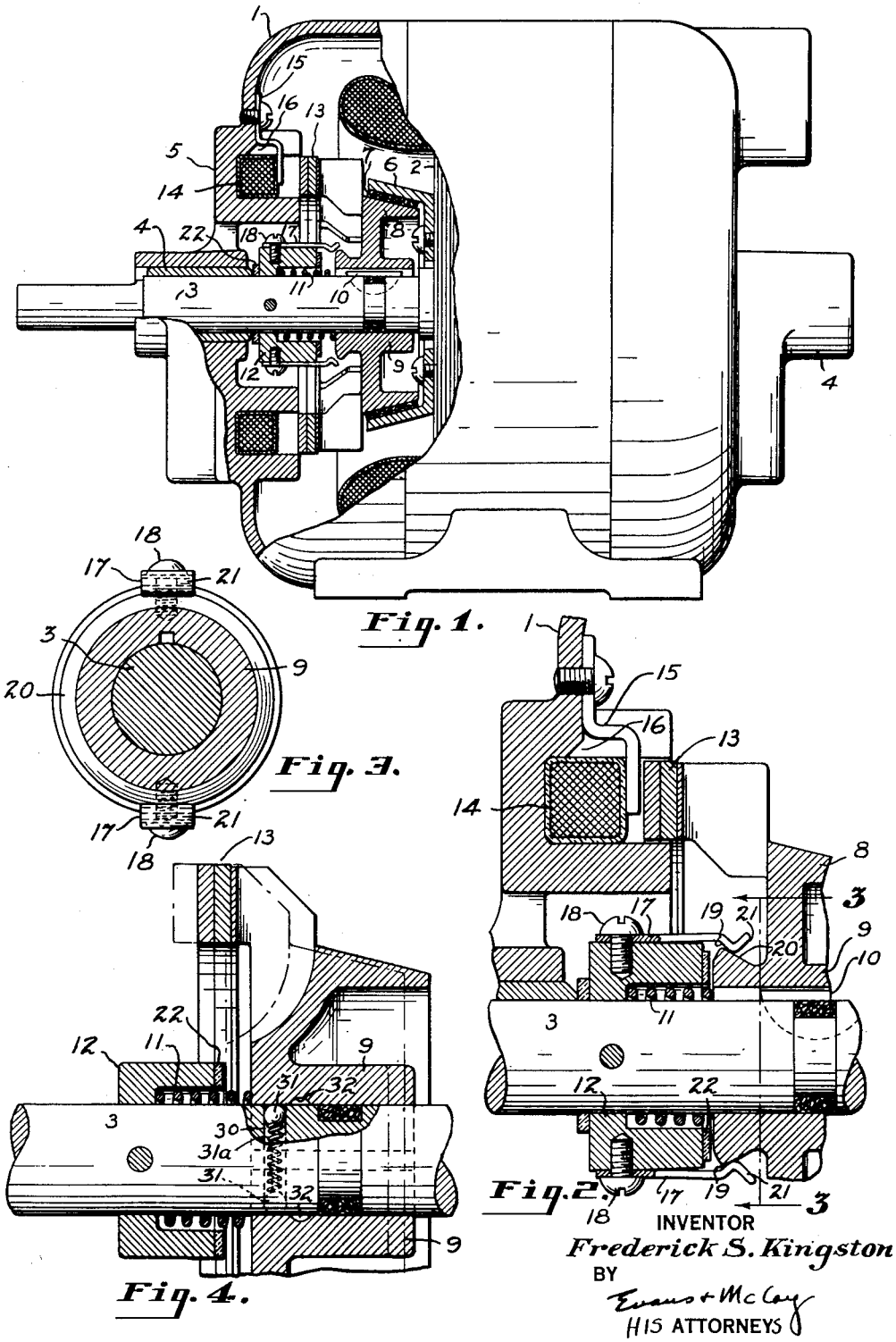
Fig. 2 is an enlarged sectional view of the clutch actuating mechanism shown in Fig. 1.
Fig. 3 is a section taken substantially on the line 3—3 of Fig. 2.
Fig. 4 is a modification showing the latching mechanism mounted within the hub of the slidable clutch element.

The particular embodiment of the invention shown in the accompanying drawing in which like numerals refer to like parts throughout the several views, is illustrated in connection with an electric motor 1 that has its rotor 2 mounted for free rotation on the rotor shaft 3, the ends of the shaft 3 being journaled in bearings 4 at the ends of the housing 5. The rotor 2 is, however, held against axial movement relative to the shaft 3.

The shaft 3, as in conventional practice, is connected with the load, and the load, when the rotor is up to the proper speed, is taken over through a clutch mechanism of any suitable construction, the elements of which engage at the proper time. As here shown, the clutch mechanism may comprise a conical element 6 lined with a suitable friction material 7 and rigidly secured to the rotor 2, and a movable cone 8 slidably mounted on the shaft 3 and which is normally in engagement with the friction material 7 of the conical element 6.

The hub 9 of the movable clutch cone 8 is slidably mounted on the shaft 3 and a suitable key 10 is provided to prevent rotation of the cone 8 relative to the shaft 3 and to permit axial movement of the cone 8 relative to the shaft 3.

A helical spring 11 which bears at one end against the hub 9 of the clutch cone 8 and at the other end against the base of a counterbored collar 12 secured to the shaft 3, resiliently forces the clutch cone 8 into engagement with the mating conical element 6 that is carried by the rotor 2.

The clutch cone 8 is held disengaged from the conical element 6 during the starting period by an annular armature 13 carried thereby which is attracted by a magnetic device, the winding of which is energized from the motor load current during the starting period and which is de-energized by a centrifugal switch mechanism or the like when the motor reaches the proper speed for taking on the load.

The annular armature 13 in the present showing is positioned to be influenced by the energization of an annular magnet winding 14 which is mounted by means of a clip 15 at the base of an annular groove 16 formed in the end of the motor housing 5. The walls of the groove 16 are parallel with each other and are coaxial with the annular armature 13 so that upon energization of the winding 14, the armature is drawn with slight circumferential clearances directly into the groove 16 against the yielding resistance of the helical spring 11, to thereby release the portions 6 and 8 of the clutch element from engagement with each other.

As shown in Fig. 2, the collar 12 has a pair of opposed spring metal fingers 17 secured to opposite sides thereof by screws 18 and which have inwardly extending latch or shoulder portions 19 thereon that are arranged to engage suitable cam-shaped interlocking members 20, these members 20 being carried by the hub 9 of the slidable clutch cone 8. The shoulder portions 19 are formed with outwardly inclined nose portions 21 which act as cam surfaces when the clutch cone 8 is being actuated by the energization of the magnet winding 14, and cause the spring metal fingers 17 to be spread apart during the outward travel of the clutch cone 8. The shoulder portions 19, as the edges of the members 20 are cleared, then through the resiliency of the fingers 17 come into engagement with the inclined faces of the members 20, so that these fingers 17 when the clutch cone 8 is pulled to its outermost position by the electromagnetic device, assist the electromagnetic device in holding the clutch elements disengaged.

The spring metal fingers 17 are of such strength that they will release the clutch cone 8 when the magnet winding 14 is de-energized, and allow the helical spring to bring the clutch elements into engagement so that the motor may take over the load. The fingers 17 do, however, assist to a substantial degree in maintaining the clutch elements disengaged or open against the closing pressure of the spring 11 when the winding 14 is energized as heretofore described.

Any suitable number of latching fingers 17 may be employed. A suitable buffer 22 of fiber is mounted at the clutch end of the collar 12 in order to form a suitable stop for the clutch cone 8.

It will readily be understood, in connection with the foregoing disclosure, that if, for instance, the electromagnet winding 14 is energized from the load current of the motor, the latching fingers 17 will assist in maintaining the clutch in load releasing position until the energization of the winding 14 drops down to a very low value, thereby holding a clutch out of load transmitting engagement until the current taken by the motor rotor reaches a relatively low value. The use of this device is also of material benefit where the winding 14 is energized from the low current, because here again the current decreases as the speed of the motor increases. It is also important, in connection with the proposed device, that if the winding 14 is controlled by the differential character of any current taken by the motor that is dependent on speed, the clutch will not be released until the current drops down to very low value, and then, after the clutch is released a material increase in current in the winding 14 will not provide sufficient electromagnetic pull on the armature 13 to again disengage the clutch. This is of particular importance in connection with refrigerator equipment and other service in which it is desired that the motor be encased and where the use of open contact terminals is objectionable, either with respect to the refrigerated gases or otherwise.

Fig. 4 of the accompanying drawing shows a modification of the invention wherein a suitable pocket 30 is formed through the shaft 3 of the motor. Suitable latch balls 31 are mounted at each end of a spring 31ª in order to engage with latching pockets 32 that are formed in the hub member 9 of the clutch cone 8. In this modification of the invention, when the electromagnetic coil 14 withdraws the clutch cone 8 from engagement with the conical element 6, the latch balls 31 enter the associated pockets 32 that are formed in the hub member 9 of the clutch cone 8 and thereby latch the clutch cone 8 out of driving engagement with the conical element 6 until after suitable low value of energization of the winding 14 is obtained. At this point the helical spring 11 will kick the hub member 9 of the clutch cone 8 free from the latch balls 31 and permit the clutch to assume a driving relation with the conical member 6.

The specific electromagnetic actuating element for the clutch unit is claimed in co-pending application Serial No. 603,809 filed on April 7, 1932.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:—

1. The combination with a driving member and a driven member of an electromagnetically controlled clutch means for normally connecting said members for driving relation, said means comprising resilient means normally holding said clutch means in engaged driving relation, an energizing winding, an armature associated with said clutch means, said armature being actuated by the energization of said winding for disengaging said clutch means, and mechanical latching means actuated to latching position with said clutch means by the actuated movement of said armature in response to the energization of said winding whereby said latching means may assist in holding said clutch means disengaged, said resilient means being of sufficient strength to actuate said latching means to its unlatched position when said winding is de-energized.

2. The combination with a driving member and a driven member of an electromagnetically controlled clutch means for normally connecting said members for driving relation, said means comprising a rigid clutch element secured to one of said members, a movable clutch element carred by the other of said elements, resilient means normally urging said movable clutch element into engagement with said rigid clutch element, an energizing winding, an armature secured to said movable clutch element and actuated by the energization of said winding to move said movable clutch element out of its normal engagement with said rigid clutch element, and mechanical latching means arranged to latch with said movable clutch element after said clutch elements are disengaged and assist in holding said clutch elements disengaged, said resilient means being of sufficient strength to actuate said latching means to unlatched position when said winding is de-energized.

3. The combination with a driving member and a driven member of an electromagnetically controlled clutch means for normally connecting said members for driving relation, said means comprising a rigid clutch element secured to one of said members, a movable clutch element carried by the other of said elements, resilient means normally urging said movable clutch element into engagement with said rigid clutch element, an energizing winding, an armature secured to said movable clutch element and actuated by the energization of said winding to move said movable clutch element out of its normal engagement with said rigid clutch element, and mechanical latching means arranged to latch with said movable clutch element after said clutch elements are disengaged and assist in holding said clutch elements disengaged, said latching means including spring pressed detents and detent receiving portions carried by said movable clutch element and the member supporting said movable clutch element, said resilient means being of sufficient strength to actuate said latching means to unlatched position when said winding is de-energized.

4. The combination with a rotary driven shaft and a driving member freely rotatable on said shaft, of a clutch element carried by said rotary shaft, a clutch element carried by said driving member, spring means normally holding said clutch elements in driving relation, electromagnet means operative to disengage said clutch elements upon energization of the winding of said electromagnetic means, and mechanical latching means associated with one of said clutch elements to latch with the same when said clutch elements are out of engagement to assist said electromagnet means in holding said clutch elements out of engagement, said spring means being of sufficient strength to unlatch said latching means upon de-energization of said winding and reengage said clutch elements.

5. The combination with a rotary driven shaft and a driving member freely rotatable on said shaft, of a clutch element carried by said rotary shaft, a clutch element carried by said driving member, spring means normally holding said clutch elements in driving relation, electromagnetic means operative to disengage said clutch elements upon energization of the winding of said electromagnetic means, and mechanical latching means associated with one of said clutch elements to latch with the same when said clutch elements are out of engagement to assist said electromagnetic means in holding said clutch elements out of engagement, said latching means including spring-pressed detents and detent receiving portions carried by the parts to be latched while said winding is energized, said spring means being of sufficient strength to unlatch said latching means upon de-energization of said winding and re-engage said clutch elements.

6. The combination with a rotary driven shaft and a driving member freely rotatable on said shaft, of a rigid clutch element secured to said driving member, a movable clutch element carried by said shaft, spring means normally forcing said movable clutch element into engagement with said rigid element, electromagnetic means having an armature secured to said movable clutch element and an energizing winding to disengage said movable element from said rigid element upon energization of said winding, and mechanical latching means including interlockable portions carried by said shaft and movable clutch element, said latching means being moved to latching position by the disengaging movement of said movable clutch element to assist said electromagnetic means in holding said movable clutch element out of engagement with said rigid clutch element, said spring means being of sufficient strength to unlatch said latching means upon de-energization of said winding and re-engage said clutch elements.

7. The combination with a rotary driven shaft and a driving member freely rotatable on said shaft, of a rigid clutch element secured to said driving member, a movable clutch element carried by said shaft, spring means normally forcing said movable clutch element into engagement with said rigid element, electromagnetic means having an armature secured to said movable clutch element and an energizing winding to disengage said movable element from said rigid element upon energization of said winding, and mechanical latching means including spring metal latch fingers carried by said shaft and latch members carried by said movable clutch element, said latching means being moved to latching position by the disengaging movement of said movable clutch element to assist said electromagnetic means in holding said movable clutch element out of engagement with said rigid clutch element, said spring means being of sufficient strength to unlatch said latching means upon de-energization of said winding and re-engage said clutch elements.

8. In combination, a rotary shaft, a driving member freely rotatable on said shaft, a rigid clutch element secured to said driving member, a movable clutch element slidably mounted on said shaft and arranged to rotate therewith, spring means resiliently holding said movable clutch element in driving engagement with said rigid element, electromagnetic means associated with said movable clutch element to draw said movable element out of engagement with said rigid element upon energization of said electromagnetic means, and means to assist said electromagnetic means in holding said movable clutch element in disengaged position while said electromagnetic means is energized, said last means including spring metal latch fingers having shoulders thereon and cam-like portions on said movable clutch element arranged to engage with said shoulders when said movable clutch element is disengaged, said spring means being of sufficient strength to disengage said shoulders from said cam-like portions upon de-energization of said electromagnetic means.

9. In combination, a rotary shaft, a driving member freely rotatable on said shaft, a rigid clutch element secured to said driving member, a movable clutch element slidably mounted on said shaft and arranged to rotate therewith, spring means resiliently holding said movable clutch element in driving engagement with said rigid element, electromagnetic means associated with said movable clutch element to draw said movable element out of engagement with said rigid element upon energization of said electromagnetic means, and means to assist said electromagnetic means in holding said movable clutch element in disengaged position while said electromagnetic means is energized, said last means including detent-receiving depressions formed in the bore of said movable clutch element and spring-pressed detents carried by said shaft within said bore, said detents being movable into said depressions when said movable clutch element is disengaged by the actuation of said electromagnetic means, said spring means being of sufficient strength to disengage said detents from said depressions upon de-energization of said electromagnetic means.

FREDERICK S. KINGSTON.